United States Patent
Lorenzi et al.

(10) Patent No.: US 11,193,001 B2
(45) Date of Patent: Dec. 7, 2021

(54) TREATMENT PLANT AND METHOD FOR PET GLYCOLYSIS

(71) Applicant: GREEN UNION S.r.l., Monza e Brianza (IT)

(72) Inventors: Micaela Lorenzi, Monza e Brianza (IT); Ferdinando Passoni, Milan (IT)

(73) Assignee: GREEN UNION S.r.l., Monza e Brianza (IT)

( * ) Notice: Subject to any disclaimer, the term of this patent is extended or adjusted under 35 U.S.C. 154(b) by 76 days.

(21) Appl. No.: 16/621,610

(22) PCT Filed: Jun. 16, 2017

(86) PCT No.: PCT/IT2017/000118
§ 371 (c)(1),
(2) Date: Dec. 11, 2019

(87) PCT Pub. No.: WO2018/229803
PCT Pub. Date: Dec. 20, 2018

(65) Prior Publication Data
US 2020/0102441 A1    Apr. 2, 2020

(51) Int. Cl.
*C08J 11/24* (2006.01)

(52) U.S. Cl.
CPC ............ *C08J 11/24* (2013.01); *C08J 2367/02* (2013.01)

(58) Field of Classification Search
USPC ........ 521/48.5; 210/266, 636; 528/190, 193, 528/194, 271, 272, 274
See application file for complete search history.

(56) References Cited

U.S. PATENT DOCUMENTS

2002/0169223 A1  11/2002  Khan et al.
2005/0096482 A1  5/2005  Tamada et al.

FOREIGN PATENT DOCUMENTS

| JP | 2002-332379 A | 11/2002 | |
|---|---|---|---|
| JP | 2004-196880 A | 7/2004 | |
| JP | 2004196880 | * 12/2004 | ............. C08G 63/04 |

OTHER PUBLICATIONS

Ryozo Tamada, Method for depolymerizing polyethylene terephthalate and apparatus therefor. JP 2004196880A Machine Translation (Year: 2004).*

International Search Report and Written Opinion of the International Searching Authority for International Patent Application No. PCT/IT2017/000118 dated Mar. 7, 2018, 9 pages.

* cited by examiner

*Primary Examiner* — Terressa Boykin
(74) *Attorney, Agent, or Firm* — Merchant & Gould P.C.

(57) ABSTRACT

A treatment plant (1) transforms a material containing PET in flakes (2) into a depolymerized material (3). The plant includes a first treatment unit (10) having a first material inlet (11) for feeding the material containing PET in flakes (2), a first unit outlet (12) for outputting a semi-finished material of molten PET (4). A first unit path (14) extends between the first unit inlet (11) and the first unit outlet (12). A compression and mixing device (20) is arranged along the first unit path (14). An injection device (30) for injecting a treatment liquid (31) leads to an injection point (32) along the first unit path (14).

15 Claims, 1 Drawing Sheet

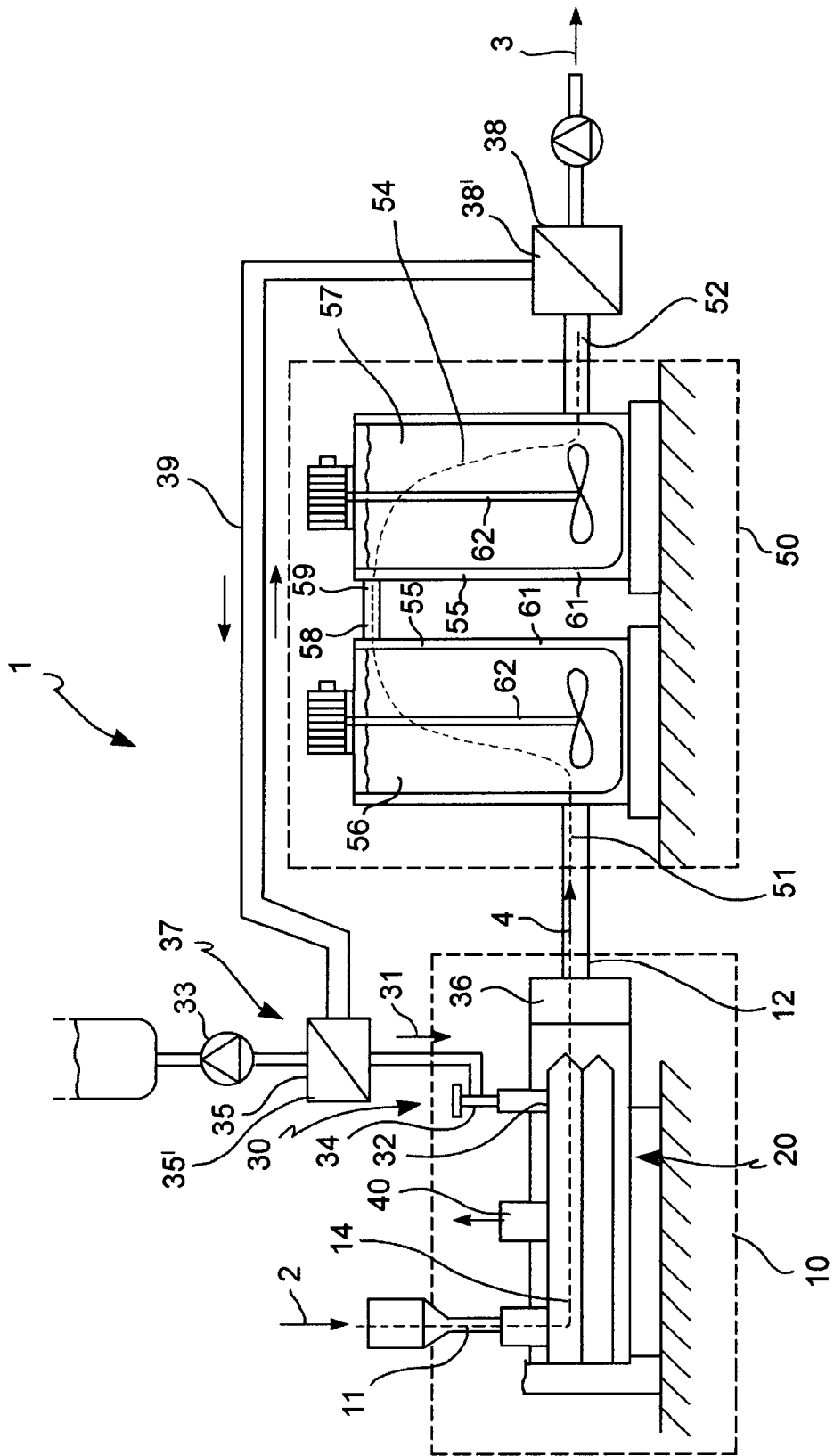

TREATMENT PLANT AND METHOD FOR PET GLYCOLYSIS

This application is a National Stage Application of PCT/IT2017/000118, filed 16 Jun. 2017, and which application is incorporated herein by reference. To the extent appropriate, a claim of priority is made to the above-disclosed application.

FIELD OF THE INVENTION

The present invention relates to a treatment plant for transforming a material comprising PET in flakes into a depolymerized material, as well as a treatment method for transforming a material comprising PET in flakes into a depolymerized material.

PRIOR ART

A need to subtract recyclable materials from municipal waste and transform them into new raw materials to make new products is well known.

PET, or polyethylene terephthalate, from which water bottles and other containers are made, is of interest among recyclable materials.

According to a known technique, such bottles or containers are separated from the waste and crushed into flakes of about 5-15 mm.

The known art further envisages arranging the PET in flakes in a melting container comprising electric resistors adapted to melt the PET in flakes, taking its temperature to about 250° C. Together with the PET in flakes, an amount of glycol is introduced into the melting container, in amount by weight of approximately 50% with respect to the total weight.

The liquid mixture of molten PET and glycol is retained inside the melting container for at least four hours.

Depolymerization of the originally introduced PET, i.e. breaking of the polymeric chains of PET and separation them into monomers, is a result of such thermal treatment.

Such depolymerized material may be supplied to a new polymerization line according to the known art, so as to obtain a new polymeric material, e.g. PET.

However, the prior art described above implies a number of disadvantages.

For example, the aforesaid depolymerization treatment is performed in discreet time cycles each one lasting at least four hours. Furthermore, the treatment requires downtimes in filling and emptying the melting container, which cannot be left in the shadow of the holding time of the PET inside the melting container.

This cyclic trend of production opposes against a required high productivity because it is closely related to the volume of the heating container, considering that the treatment time would be rather long, i.e. at least four hours. Furthermore, the cyclical trend induces thermal and mechanical stresses in the plant which are also cyclical, stressing in a discontinuous manner the components of the plant itself and reducing its lifetime.

Another disadvantage of the prior art is that it does not make it possible to obtain a high purity depolymerized product starting from PET in flakes "polluted" by waste particles. Indeed, the low pressures involved in the known system do not make it possible to filter the depolymerized material in order to separate it from the pollutants.

Another disadvantage of the prior art is that of requiring a high quantity of energy for heating the melting container to take the PET which is contained therein to a temperature of about 250° C. and to maintain such temperature for the entire duration of the treatment of at least four hours.

In particular, such known solutions do not make it possible to obtain a depolymerized material of high purity from a material comprising PET in flakes of low purity, and to obtain a high productivity with low energy consumption.

SUMMARY OF THE INVENTION

It is an object of the present invention to devise and make available a plant and a method for treating PET in flakes to obtain a depolymerized material, which makes it possible to satisfy the aforesaid needs and to at least partially overcome the drawbacks described above with reference to the prior art.

In particular, it is a task of the present invention to make available a plant and a method for treating PET in flakes to obtain a depolymerized material which makes it possible to receive PET in flakes having a not high purity, in particular with presence of extraneous components to be separated, while outputting a depolymerized material having high purity.

It is another object of the present invention to make available a plant and a treatment method for treating of PET in flakes to obtain a depolymerized material, capable of supplying a high continuous hourly production rate.

It is another object of the present invention to make available a plant and a treatment method for treating PET in flakes to obtain a depolymerized material, capable of requiring an amount of energy considerably reduced with respect to that required according to the prior art.

BRIEF DESCRIPTION OF THE DRAWINGS

The invention will be illustrated below by describing some embodiments by way of non-limiting example, with reference to the accompanying FIGURES, wherein:

FIG. 1 diagrammatically illustrates a treatment plant for transforming a material comprising PET in flakes into a depolymerized material according to the invention.

DESCRIPTION OF THE PREFERRED EMBODIMENTS

With reference to the FIGURES, a treatment plant according to the invention, for transforming a material comprising PET in flakes into a depolymerized material, is indicated as a whole by numeral reference 1.

With PET (polyethylene terephthalate) material in flakes is intended to mean a PET material reduced in thin fragments which extend mainly along two directions, preferably obtained by means of fragmentation or crushing of used PET containers, e.g. PET bottles.

In other words, the material comprising PET in flakes is obtained by recycling PET containers.

The material comprising PET in flakes may also comprise PET in granules, e.g. virgin or also recycled.

In a preferred form, the material comprising PET in flakes is a mixture comprising a part of PET in flakes from recycling and a part of PET in virgin granules.

PET in virgin granules means PET in granules which are not recycled.

With depolymerized material is intended to mean a material wherein PET polymeric chains are reduced in monomers. Such material is preferably liquid at ambient temperature.

With PET glycolysis is intended to mean a breakage process of the chemical bonds of the PET polymeric chain to obtain a plurality of monomers from it.

The plant 1 comprises a first treatment unit 10 and a second treatment unit 50 arranged downstream of the first unit 10.

The first treatment unit 10 has a first unit inlet 11 to feed the material comprising PET in flakes 2, a first unit outlet 12 to output a semi-finished material comprising molten PET 4, and a first unit path 14 between said first unit inlet 11 and said first unit outlet 12.

The first unit further comprises a compression and mixing device 20 arranged along the first unit path 14.

The compression and mixing device 20 comprises an extruder device.

The extruder device is preferably a screw extruder.

The screw extruder device compresses the material comprising PET flakes by rotating the screw with respect to an inner chamber of the extruder, in which the screw is arranged and rotated. The geometry of the screw and of the inner chamber may be varied in order to optimize the desired effect of melting the PET in flakes compressed between screw and chamber, because of the compression itself.

Also the number of screws of the extruder may be varied in order to optimize the result.

According to a preferred embodiment, the screw extruder is of the type comprising two co-penetrating parallel screws, or twin screw extruder.

The compression device 20, or extruder, may require to be heated, at least in a starting step of operation.

In such a case, extruder may comprise extruder heating means, not shown in the FIGURES, e.g. comprising electric resistors and/or comprising fuel heaters and/or comprising a heat exchanger.

According to a possible embodiment, the extruder heating means comprise a heat collecting device arranged in thermal contact with an outlet 52 of the second treatment unit.

According to an embodiment, the first treatment unit is configured to output the semi-finished material comprising molten PET having a predetermined semi-finished material temperature.

According to a preferred embodiment, the aforesaid predetermined semi-finished material temperature is comprised between 230° C. and 280° C., and even more preferably about 250° C.

In this manner, it is advantageously obtained that the semi-finished material temperature remains sufficiently far from the critical temperature values, such as the PET decomposition temperature, which is 340° C.

The first treatment unit 10 also comprises an injection device 30 for introducing a treatment liquid 31, leading to an injection point 32 along the first unit path 14.

The injection device 30, by means of the injection point, introduces the treatment liquid 31 into the material comprising PET in flakes and/or into the already molten PET, which transits along the first unit path 14, as a consequence of the operation of the compression and mixing device 20.

According to an embodiment, the injection point 32 leads into the extrusion chamber. In this case, the rotation of the screw in addition to compressing the PET, mixes with the aforesaid treatment liquid.

According to an embodiment, the injection point 32 is arranged near the first unit outlet 12. In such a case, the treatment liquid 31 is added to the molten PET, in an inner end zone of the extruder, where the temperature and the pressure of the molten PET are high.

According to an embodiment, the aforesaid compression and mixing device 20, in particular the extruder, is configured to take the aforesaid pressure of the molten PET near the first unit outlet 12, to a value comprised between 80 and 120 bar, preferably approximately 100 bar.

According to this embodiment, the treatment liquid 31 is introduced along the first unit path 14, preferably near the first unit outlet 12, having pressure and temperature values close to the aforesaid molten PET temperature and pressure value near the outlet of the first unit 12.

For this purpose, according to an embodiment, the injection device 30 comprises a pump-compressor 33 for providing a predetermined pressure value to the treatment liquid 31.

For the reasons explained above, the predetermined pressure value is comprised between 80 bar and 120 bar, preferably about 100 bar.

According to an embodiment, the injection device 30 further comprises a dosing device 34 adapted to supply said treatment liquid 31 according to a predetermined percentage by weight with respect to the total weight of material comprising PET in flakes and treatment liquid.

According to an embodiment, the aforesaid percentage by weight is comprised between 35% and 65%, preferably is about 50%.

The temperature of the injected treatment liquid should be close to the molten PET temperature value near the injection point 32.

For these reasons, according to an embodiment, the injection device 30 comprises heating means 35 for heating the treatment liquid, preferably having a temperature comprised between 230° C. and 280° C., even more preferably of about 250° C.

According to a preferred embodiment, such treatment liquid comprises ethylene glycol.

If the treatment liquid comprises, or is, ethylene glycol, the aforesaid temperature is particularly advantageous, because it is far from the flame temperature of glycol, which is about 110° C., far from the boiling temperature of glycol, which is 138° C., and far from the autoignition temperature of glycol, which is about 410° C.

A particularly important advantage obtained from the compression and mixing of the PET together with the ethylene glycol at the aforesaid temperature, pressure, and percentage by weight conditions, as described above, is that in this manner a partial depolymerization reaction is started of the PET which is already inside the first treatment unit, or at least near the first unit outlet 12, providing, from the first treatment unit 10, a semi-finished material comprising molten, partially depolymerized PET.

The glycol facilitates the breakdown of the polymeric chains of the PET into single monomers, to obtain the depolymerized material.

According to an embodiment, the first treatment unit comprises a degassing device 40 arranged along the first unit path 14. The degassing device 40 is adapted to remove, from the PET transiting in the first treatment unit 10, gas and vapors which separate from the PET during compression and mixing. Indeed, compressing the PET raises its temperature because of friction.

The degassing device 40 comprises a gas extraction passage between the first unit path 14 and the outside.

According to an embodiment, the degassing device 40 is associated with the compressing and mixing device 20, for example is associated with the extruder 20.

According to an embodiment, the degassing device 40 comprises a passage which extends between the inner chamber of the extruder and the outside.

According to an embodiment, the degassing device 40 is interposed between the first unit inlet 11 and the first unit outlet 12.

According to an embodiment, the degassing device 40 is interposed between the first unit inlet 11 and the injection device 30.

The presence of the degassing device 40 is particularly advantageous because it makes it possible to introduce moist PET flakes, having humidity values of even about 1%-2% into the plant 1.

According to an embodiment, the first treatment unit comprises a filter 36 arranged at said first unit outlet 12.

The filter 36, according to an embodiment, comprises at least one grid having a predetermined mesh value.

Such filter 36 makes it possible to separate coarse extraneous bodies from the semi-finished material product comprising molten PET, and to output a substantially liquid material from the first treatment unit.

According to an embodiment, the treatment plant 1 comprises a second treatment unit 50 arranged downstream of the first treatment unit 10 and having a second unit inlet 51 to receive said semi-finished material comprising molten PET 4, a second unit outlet 52 to output said depolymerized material 3, a second unit path 54 between the second unit inlet 51 and the second unit outlet 52.

According to an embodiment, the second unit path 54 comprises at least one accumulation tank 56, 57 fluidically connected to the second treatment unit inlet 51 and to the outlet of said second treatment unit 52.

According to an embodiment, the second unit path 54 comprises means for maintaining the temperature 55 of said second unit path 54 at a predetermined temperature value.

The second unit inlet 51 is connected to the first unit outlet 12.

According to an embodiment, the temperature maintaining means 55 comprise an insulation layer 61 which at least partially envelops the second unit path 54.

According to an embodiment, the at least one accumulation tank 56, 57 comprises means for separating the pollutant from the molten PET, for example plastics other than PET, by difference of density.

For example, such means provide for the at least one storage tank 56, 57 to have a tank inlet 51, 59 arranged at a first height, and a tank outlet 58, 52 arranged at a second height, both measured vertically with respect to a same resting plane, in which the first height is different from said second height.

Indeed, the molten PET has a lower value of density than that of other molten plastics or other components different from molten PET; thus, the molten PET tends to float while the pollutants tend to accumulate on the bottom of the at least one tank 56, 57.

According to an embodiment, the at least one tank comprises a discharge (not shown in the FIGURE) arranged at the bottom of the at least one tank, which makes it possible to remove the accumulated pollutants.

According to an embodiment, the at least one accumulation tank 56, 57 comprises at least two accumulation tanks 56, 57 arranged in series each other, for example at least one tank 56, 57 consists of two accumulation tanks arranged in series.

According to an embodiment, the at least one or both of said at least one tank 56, 57, has a predetermined volume comprised between 800 and 1200 liters, preferably about 1000 liters.

According to an embodiment, said or each of said at least one tank 56, 57, comprises a mixer 62 adapted to mix the material comprising molten PET inside said or each of said at least one tank 56, 57.

According to an embodiment, the plant 1 comprises heat transfer means 37 thermally connected to said second unit 50 and to said first unit 10 for transferring a quantity of heat from said second unit 50 to said first unit 10.

According to an embodiment, the heat transfer means comprise said heating means 35 for heating the treatment liquid and comprise heat collecting means 38 thermally connected to said second unit outlet 52, said heat collecting means 38 and said heating means being thermally connected to one another.

According to an embodiment, the heating means 35 and the heat collecting means 38 comprise at least one heat exchanger.

According to an embodiment, the heating means 35 comprise a first heat exchanger 35' in thermal contact with said injection device 30, and the heat collecting means 38 comprise a second heat exchanger 38', and wherein the first heat exchanger 35' and the second heat exchanger 38' are thermally connected to one another by means of supply and return pipes 39 to conduct a heat transfer means, for example a liquid, between said first heat exchanger 35' and said second heat exchanger 38'.

According to another aspect of the present invention, the aforesaid and other objects and advantages are satisfied by a treatment method for transforming a material comprising PET in flakes 2 into a depolymerized material 3.

Such method may be implemented by means of a treatment plant 1 for transforming a material comprising PET in flakes 2 into a depolymerized material 3 as described above.

The method comprises the step of providing a first treatment unit 10 having a first unit inlet 11 for feeding the material comprising PET in flakes 2, a first unit outlet 12 for outputting a semi-finished material comprising molten PET 4, a first unit path 14 between said first unit inlet 11 and said first unit outlet 12, a compression and mixing device 20, preferably an extruder device, arranged along said first unit path 14, an injection device 30 for injecting a treatment liquid, leading to an injection point 32 along said first unit path 14.

Furthermore, according to an embodiment, the method comprises a step of providing a second treatment unit 50 having a second unit inlet 51 for receiving said semi-finished material comprising molten PET 4 and a second unit outlet 52 for outputting said depolymerized material 3, a second unit path 54 between said second unit inlet 51 and said second unit outlet 52, said second unit inlet 51 being connected to said first unit outlet 12.

The method further comprises a step of feeding said material comprising PET in flakes 2 into said first unit 10 through said first unit inlet 11; compressing and at the same time mixing until melting said material comprising PET in flakes 2 into said compression and mixing device 20, preferably into the extruder device; injecting the treatment liquid 31 through said injection point 32 along said first unit path 14; outputting said semi-finished material comprising molten PET 4 through said first unit outlet 12.

According to an embodiment, the method further comprises a step of feeding said semi-finished material comprising molten PET 4 into said second treatment unit 50 through said second unit inlet 51; maintaining, preferably at predetermined temperature, said semi-finished material comprising molten PET 4 along said second unit path 54, preferably inside said at least one accumulation tank, to obtain said depolymerized material 3; outputting said depolymerized material 3 through said first unit outlet 52.

Preferably, the semi-finished material comprising molten PET 4 is maintained inside the second unit path 54, preferably inside at least one accumulation tank, for a time such to complete a depolymerization reaction of said semi-finished material to obtain said depolymerized material.

According to an embodiment, the step of injecting the treatment liquid 31 comprises a step of preventively compressing the treatment liquid 31 to a predetermined pressure value and of dosing the treatment liquid according to a predetermined percentage by weight with respect to the total weight of PET in flakes 2 and treatment liquid 31.

According to an embodiment, the step of injecting the treatment liquid 31 comprises a step of heating the treatment liquid 31 to a predetermined temperature value.

According to an embodiment, the step of outputting said semi-finished material comprising molten PET 3, comprises a step of filtering said semi-finished material comprising molten PET 3, preferably downstream of said at least one accumulation tank.

According to an embodiment, the method comprises a step of separating polluting components from said depolymerized material 3 either along or at the end of said second unit path 54.

According to an embodiment, the second unit path 54 comprises at least one accumulation tank 56, 57 fluidically connected to the second treatment unit inlet 51 and to the outlet of said second treatment unit 52.

Preferably, the step of separating occurs in the at least one accumulation tank 56, 57, for difference of density between the depolymerized material and said polluting components.

According to an embodiment, the method comprises a step of transferring a quantity of heat from the outlet of the second treatment unit 52 to the injection device 30 of treatment liquid 31.

A person skilled in art may make changes and adaptations to the embodiments to the device described above or may replace elements with others which are functionally equivalent to satisfy contingent needs without departing from the scope of protection of the appended claims. All the features described above as belonging to a possible embodiment may be implemented independently from the other described embodiments.

The means and materials for making the various described functions may be of various nature without departing from the scope of the invention.

It is worth noting that the terminology or expressions used are only descriptive and therefore non limiting.

All the features described here and/or in any step of the method may be combined in any combination, except for the combinations in which at least some of such features and/or phases mutually exclude one another.

The invention claimed is:

1. A treatment plant for transforming a material comprising PET in flakes into a depolymerized material, comprising:
    a first treatment unit having a first unit inlet for feeding the material comprising PET in flakes, a first unit outlet to output a semi-finished material comprising molten PET and depolymerized PET, a first unit path between said first unit inlet and said first unit outlet, an extrusion device arranged along said first unit path, an injection device for a treatment liquid leading to an injection point along said first unit path, and a filter arranged at said first unit outlet;
    a second treatment unit arranged downstream of the first treatment unit, having a second unit inlet receiving said semi-finished material comprising molten PET and depolymerized PET and a second unit outlet outputting said depolymerized material, a second unit path between said second unit inlet and said second unit outlet, said second unit inlet being connected to said first unit outlet;
    wherein said second unit path comprises at least one accumulation tank for said semi-finished material comprising molten PET, and said at least one accumulation tank comprises a gravitational separator for separating pollutants from the molten PET by difference of density; and
    wherein the injection device comprises a pump-compressor to provide the treatment liquid with a predetermined pressure value, and a dosing device adapted to provide said treatment liquid according to a percentage by weight with respect to a total weight of the material comprising PET in flakes and treatment liquid.

2. The treatment plant according to claim 1, wherein the treatment liquid comprises ethylene glycol.

3. The treatment plant according to claim 1, wherein the predetermined pressure value is between 80 bar and 120 bar.

4. The treatment plant according to claim 1, wherein the predetermined percentage by weight is between 35% and 65%.

5. A treatment plant for transforming a material comprising PET in flakes into a depolymerized material, comprising:
    a first treatment unit having a first unit inlet for feeding the material comprising PET in flakes, a first unit outlet to output a semi-finished material comprising molten PET and depolymerized PET, a first unit path between said first unit inlet and said first unit outlet, an extrusion device arranged along said first unit path, an injection device for a treatment liquid leading to an injection point along said first unit path, and a filter arranged at said first unit outlet;
    a second treatment unit arranged downstream of the first treatment unit, having a second unit inlet receiving said semi-finished material comprising molten PET and depolymerized PET and a second unit outlet outputting said depolymerized material, a second unit path between said second unit inlet and said second unit outlet, said second unit inlet being connected to said first unit outlet;
    wherein said second unit path comprises at least one accumulation tank for said semi-finished material comprising molten PET, and said at least one accumulation tank comprises a gravitational separator for separating pollutants from the molten PET by difference of density; and
    wherein the second unit path comprises means for maintaining the temperature of said second unit path at a predetermined temperature value.

6. The treatment plant according to claim 1, wherein said gravitational separator comprises a tank inlet of the at least one tank arranged at a first height, and a tank outlet of the at least one tank arranged at a second height, both the first height and the second height measured vertically with respect to a same resting plane, wherein the first height is different with respect to said second height.

7. The treatment plant according to claim 1, wherein said second unit path comprises a filter for separating impurities from said depolymerized material.

8. The treatment plant according to claim 1, wherein the injection device comprises a heater for heating the treatment liquid.

9. A treatment plant for transforming a material comprising PET in flakes into a depolymerized material, comprising:
   a first treatment unit having a first unit inlet for feeding the material comprising PET in flakes, a first unit outlet to output a semi-finished material comprising molten PET and depolymerized PET, a first unit path between said first unit inlet and said first unit outlet, an extrusion device arranged along said first unit path, an injection device for a treatment liquid leading to an injection point along said first unit path, and a filter arranged at said first unit outlet;
   a second treatment unit arranged downstream of the first treatment unit, having a second unit inlet receiving said semi-finished material comprising molten PET and depolymerized PET and a second unit outlet outputting said depolymerized material, a second unit path between said second unit inlet and said second unit outlet, said second unit inlet being connected to said first unit outlet; and
   heat transfer means thermally connected to said second unit and to said first unit for transferring a quantity of heat from said second unit to said first unit;
   wherein said second unit path comprises at least one accumulation tank for said semi-finished material comprising molten PET, and said at least one accumulation tank comprises a gravitational separator for separating pollutants from the molten PET by difference of density.

10. The treatment plant according to claim 9, wherein said heat transfer means comprise said heater for heating the treatment liquid and heat collecting means thermally connected to said second unit outlet, said heat collecting means and said heater being thermally connected to one another.

11. The treatment plant according to claim 10, wherein the heater and the heat collecting means comprise at least one heat exchanger.

12. A treatment method for transforming a material comprising PET in flakes into a depolymerized material, comprising the steps of:
   providing a first treatment unit having a first unit inlet for feeding the material comprising PET in flakes, a first unit outlet to output a semi-finished material comprising molten PET, a first unit path between said first unit inlet and said first unit outlet, an extruder device arranged along said first unit path, an injection device for a treatment liquid leading to an injection point along said first unit path;
   providing a second treatment unit having a second unit inlet for receiving said semi-finished material comprising molten PET and a second unit outlet for outputting said depolymerized material, a second unit path between said second unit inlet and said second unit outlet, said second unit inlet being connected to said first unit outlet;
   feeding said material comprising PET in flakes into said first unit through said first unit inlet;
   compressing and at the same time mixing said material comprising PET in flakes until melting, by said extruder device;
   injecting the treatment liquid through said injection point along said first unit path;
   outputting said semi-finished material comprising molten PET through said first unit outlet, the step of outputting said semi-finished material comprising molten PET comprises a step of filtering said semi-finished material comprising molten PET;
   feeding said semi-finished material comprising molten PET into said second treatment unit through said second unit inlet;
   maintaining said semi-finished material containing molten PET into said second unit path to obtain said depolymerized material;
   separating polluting components from said depolymerized material along said second unit path, the step of separating occurring by difference of density between density of said polluting components and density of said depolymerized material;
   outputting said depolymerized material through said first unit outlet.

13. The treatment method according to claim 12, wherein the step of injecting the treatment liquid comprises a step of preventively compressing the treatment liquid to a predetermined pressure value and dosing the treatment liquid according to a predetermined percentage by weight with respect to a total weight of PET in flakes and treatment liquid.

14. The treatment method according to claim 13, wherein the step of injecting the treatment liquid comprises a step of heating the treatment liquid to a predetermined temperature value.

15. The treatment method according to claim 12, comprising a step of transferring a quantity of heat from the second treatment unit outlet to the injection device of the treatment liquid.

* * * * *